United States Patent
Zhu

(10) Patent No.: US 10,991,166 B2
(45) Date of Patent: Apr. 27, 2021

(54) ELECTRIC APPLIANCE CONTROL METHOD, TERMINAL, ELECTRIC APPLIANCE, ELECTRONIC EQUIPMENT AND STORAGE MEDIUM

(71) Applicant: BAIDU ONLINE NETWORK TECHNOLOGY (BEIJING) CO., LTD., Beijing (CN)

(72) Inventor: Kang Zhu, Beijing (CN)

(73) Assignee: BAIDU ONLINE NETWORK TECHNOLOGY (BEIJING) CO., LTD.

(*) Notice: Subject to any disclaimer, the term of this patent is extended or adjusted under 35 U.S.C. 154(b) by 0 days.

(21) Appl. No.: 16/511,229

(22) Filed: Jul. 15, 2019

(65) Prior Publication Data
US 2019/0340840 A1    Nov. 7, 2019

(30) Foreign Application Priority Data

Aug. 6, 2018   (CN) .......................... 201810887704.3

(51) Int. Cl.
G06T 19/20    (2011.01)
G06F 3/0484   (2013.01)
G06F 9/451    (2018.01)

(52) U.S. Cl.
CPC ............ *G06T 19/20* (2013.01); *G06F 3/0484* (2013.01); *G06F 3/04847* (2013.01);
(Continued)

(58) Field of Classification Search
CPC ... G06T 19/006; G06T 19/20; G06T 2200/24; G06T 2219/2016; G06T 2219/2012;
(Continued)

(56) References Cited

U.S. PATENT DOCUMENTS

| 2009/0271365 A1* | 10/2009 | Chen ..................... G06F 9/451 |
| 2011/0138416 A1* | 6/2011 | Kang ............... H04N 21/42208 725/39 |
| 2019/0129607 A1* | 5/2019 | Saurabh .............. G06F 3/04817 |

FOREIGN PATENT DOCUMENTS

| CN | 105915418 A | 8/2016 |
| CN | 106155002 A | 11/2016 |

(Continued)

OTHER PUBLICATIONS

Shirehjini, Ali Asghar Nazari, and Azin Semsar. "Human interaction with IoT-based smart environments." Multimedia Tools and Applications 76.11 (2017): 13343-13365. (Year: 2017).*

(Continued)

*Primary Examiner* — Daniel F Hajnik
(74) *Attorney, Agent, or Firm* — Dilworth IP, LLC

(57) ABSTRACT

An electric appliance control method, a terminal, an electric appliance, an electronic equipment and a storage medium. The method includes displaying a three-dimensional model configured to simulate an electric appliance, where the three-dimensional model includes a manipulation unit configured to simulate a manipulation component on the electric appliance; obtaining simulated manipulation information, where the simulated manipulation information is generated after a user performs a simulated manipulation on the manipulation unit, and the simulated manipulation information is the same as information generated by the manipulation component after an actual manipulation corresponding to the simulated manipulation is performed; transmitting the simulated manipulation information to a network device, so that the network device transmits the simulated manipulation information to the electric appliance and controls the electric appliance to execute a control instruction corresponding to the simulated manipulation information. The (Continued)

Displaying a three-dimensional model configured to simulate an electric appliance — S101

Obtaining simulated manipulation information — S102

Transmitting the simulated manipulation information to a network device, so that the network device transmits the simulated manipulation information to the electric appliance and controls the electric appliance to execute a control instruction corresponding to the simulated manipulation information — S103 present disclosure further improves the convenience of manipulation.

16 Claims, 5 Drawing Sheets

(52) U.S. Cl.
CPC .......... *G06F 9/451* (2018.02); *G06T 2200/24* (2013.01); *G06T 2219/2016* (2013.01)

(58) Field of Classification Search
CPC .... G06F 3/04847; G06F 9/451; G06F 3/0484; G06F 3/0487; G08C 17/02
See application file for complete search history.

(56) References Cited

FOREIGN PATENT DOCUMENTS

| CN | 107526501 A | 12/2017 |
|---|---|---|
| CN | 109147056 A | 1/2019 |
| WO | 2018031861 A1 | 2/2018 |

OTHER PUBLICATIONS

Nedelcu, Adrian-Valentin, et al. "Conceptual integration of wireless sensor networks with 3D virtual environments." 2010 IEEE International Conference on Wireless Communications, Networking and Information Security. IEEE, 2010. (Year: 2010).*
NPL Video Titled "3.0 gen. demo", published Jan. 3, 2016 on Youtube. Available for viewing at: https://www.youtube.com/watch?v=xJS2rZmylil; select screenshots included. (Year: 2016).*
First Office Action issued in CN Patent Application No. 201810887704.3 dated Mar. 20, 2020.
Pro/Engineer 5.0, www.duxiu.com, pp. 24-27.
AutoCAD 2015, www.duxiu.com, pp. 265-268.
Notice of Rejection issued in CN Patent Application No. 201810887704.3 dated Sep. 16, 2020.

* cited by examiner

ELECTRIC APPLIANCE CONTROL METHOD, TERMINAL, ELECTRIC APPLIANCE, ELECTRONIC EQUIPMENT AND STORAGE MEDIUM

CROSS-REFERENCE TO RELATED APPLICATIONS

The present disclosure claims priority to Chinese application No. 201810887704.3, filed on Aug. 6, 2018, which is incorporated by reference in its entirety.

FIELD

The present disclosure relates to the field of electronic terminal, and more particularly to an electric appliance control method, a terminal, an electric appliance, an electronic equipment and a storage medium.

BACKGROUND

Electric appliance can refer to all kinds of appliances working by means of electricity. A common electric appliance in life may be, for example, an electric fan, a washing machine, an electric light, etc. Usually, in order to realize the control of the electric appliance, manipulation components on the electric appliance can be directly controlled. However, this manipulation method requires a user to go to the vicinity of the appliance to manipulate, which is not convenient.

In the related prior art, in order to realize more convenient control, a remote controller can be used to issue a control command to the electric appliance. However, the manipulation difficulty of the manipulation performed by a user using a remote controller is subject to the user's familiarity with the remote controller. If the user is not familiar with the remote controller, it will be difficult for the user to effectively implement the control due to the difference between the keys or other objects on the remote controller and the manipulation components on the appliance that can be directly controlled, and the user experience is poor.

SUMMARY

The present disclosure provides an electric appliance control method, a terminal, an electric appliance, an electronic equipment and a storage medium to solve the problem that the difficulty in manipulation is subject to the familiarity with the remote controller.

According to a first aspect of the present disclosure, an electric appliance control method is provided, which is applied to a terminal and includes:

displaying a three-dimensional model configured to simulate an electric appliance; where the three-dimensional model includes a manipulation unit configured to simulate a manipulation component on the electric appliance;

obtaining simulated manipulation information, where the simulated manipulation information is generated after a user performs a simulated manipulation on the manipulation unit and the simulated manipulation information is the same as information generated by the manipulation component corresponding to the manipulation unit after an actual manipulation corresponding to the simulated manipulation is performed;

transmitting the simulated manipulation information to a network device, so that the network device transmits the simulated manipulation information to the electric appliance and controls the electric appliance to execute a control instruction corresponding to the simulated manipulation information.

Optionally, the three-dimensional model further comprises a display unit configured to simulate a display component on the electric appliance, and after the displaying a three-dimensional model configured to simulate an electric appliance, the method further includes:

obtaining display information, where the display information is information currently displayed on the display component of the electric appliance;

displaying the display information on the display unit.

Optionally, after the displaying a three-dimensional model configured to simulate an electric appliance, the method further includes:

obtaining a display change instruction; where the display change instruction comprises at least one of the following: a zoom instruction to control a size of the three-dimensional model, a rotation instruction to control the three-dimensional model to rotate, and a movement instruction to control the three-dimensional model to move;

changing a display state of the three-dimensional model in an interface according to the display change instruction.

Optionally, if the manipulation component is a button, then the manipulation unit is a button unit configured to simulate the button, the simulated manipulation is a click on the button unit, and the actual manipulation corresponding to the simulated manipulation is a press on the button.

If the manipulation component is a knob, then the manipulation unit is a knob unit configured to simulate the knob, the simulated manipulation is sliding the knob unit, and the actual control corresponding to the simulated manipulation is rotating the knob.

If the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

According to a second aspect of the present disclosure, an electric appliance control method is provided, which is applied to an electric appliance and includes:

receiving simulated manipulation information transmitted by a terminal through a network device, where the simulated manipulation information is generated after a user performs a simulated manipulation on a manipulation unit in a three-dimensional model displayed by the terminal; where the three-dimensional model is configured to simulate the electric appliance, and the manipulation unit is configured to simulate a manipulation component on the electric appliance; and where the simulated manipulation information is the same as information generated by the manipulation component corresponding to the manipulation unit after an actual manipulation corresponding to the simulated manipulation is performed;

executing a control instruction corresponding to the simulated manipulation information.

Optionally, the three-dimensional model further includes a display unit configured to simulate a display component on the electric appliance, and the method further includes:

transmitting display information to the network device so that the terminal displays the display information on the display unit, where the display information is information currently displayed by the display component of the electric appliance.

According to a third aspect of the present disclosure, a terminal is provided, which includes:

a displaying module, configured to display a three-dimensional model configured to simulate an electric appliance; where the three-dimensional model includes a manipulation unit configured to simulate a manipulation component on the electric appliance;

a first obtaining module, configured to obtain simulated manipulation information, where the simulated manipulation information is generated after a user performs a simulated manipulation on the manipulation unit, and the simulated manipulation information is the same as information generated by the manipulation component corresponding to the manipulation unit after an actual manipulation corresponding to the simulated manipulation is performed;

a transmitting module, configured to transmit the simulated manipulation information to a network device, so that the network device transmits the simulated manipulation information to the electric appliance and controls the electric appliance to execute a control instruction corresponding to the simulated manipulation information.

Optionally, the three-dimensional model further includes a display unit configured to simulate a display component on the electric appliance, and the terminal further includes:

a second obtaining module, configured to obtain display information, where the display information is information currently displayed by the display component of the electric appliance;

a display information processing module, configured to display the display information on the display unit.

Optionally, the terminal further includes:

a third obtaining module, configured to obtain a display change instruction; where the display change instruction includes at least one of the following: a zoom instruction to control a size of the three-dimensional model, a rotation instruction to control the three-dimensional model to rotate, and a movement instruction to control the three-dimensional model to move;

a first changing module, configured to change a display state of the three-dimensional model in an interface according to the display change instruction.

Optionally, if the manipulation component is a button, then the manipulation unit is a button unit configured to simulate the button, the simulated manipulation is a click on the button unit, and the actual manipulation corresponding to the simulated manipulation is a press on the button.

Optionally, if the manipulation component is a knob, then the manipulation unit is a knob unit configured to simulate the knob, the simulated manipulation is sliding the knob unit, and the actual manipulation corresponding to the simulated manipulation is rotating the knob.

Optionally, if the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

According to a fourth aspect of the present disclosure, an electric appliance is provided, which includes:

a receiving module, configured to receive simulated manipulation information transmitted by a terminal through a network device, where the simulated manipulation information is generated after a user performs a simulated manipulation on a manipulation unit in a three-dimensional model displayed by the terminal; where the three-dimensional model is configured to simulate the electric appliance, and the manipulation unit is configured to simulate a manipulation component on the electric appliance; and where the simulated manipulation information is the same as information generated by the manipulation component corresponding to the manipulation unit after an actual manipulation corresponding to the simulated manipulation is performed;

an executing module, configured to execute a control instruction corresponding to the simulated manipulation information.

Optionally, the three-dimensional model further comprises a display unit configured to simulate a display component on the electric appliance, and the electric appliance further includes:

a display information transmitting module, configured to transmit display information to the network device so that the terminal displays the display information on the display unit, where the display information is information currently displayed by the display component of the electric appliance.

Optionally, if the manipulation component is a button, then the manipulation unit is a button unit configured to simulate the button, the simulated manipulation is a click on the button unit, and the actual manipulation corresponding to the simulated manipulation is a press on the button.

Optionally, if the manipulation component is a knob, then the manipulation unit is a knob unit configured to simulate the knob, the simulated manipulation is sliding the knob unit, and the actual manipulation corresponding to the simulated manipulation is rotating the knob.

Optionally, if the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

According to a fifth aspect of the present disclosure, an electronic equipment is provided, which includes a memory and a processor, where the memory is configured to store executable instructions of the processor;

the processor is configured to perform an electric appliance control method related to the first aspect and its optional implementations, or the second aspect and its optional implementations, by executing the executable instructions.

According to a sixth aspect of the present disclosure, a storage medium having a computer program stored thereon is provided, where an electric appliance control method related to the first aspect and its optional implementations, or the second aspect and its optional implementations are implemented when the program is executed by a processor.

The electric appliance control method, the terminal, the electric appliance, the electronic equipment and the storage medium provided by the present disclosure provide an object for a user to manipulate by displaying a three-dimensional model which is configured to simulate an electric appliance and which includes a manipulation unit configured to simulate a manipulation component on the electric appliance. Moreover, the present disclosure controls the electric appliance to execute a control instruction corresponding to the simulated manipulation information by obtaining simulated manipulation information and transmitting the simulated manipulation information to a network device. In the present disclosure, since the object to be manipulated is a three-dimensional model of an electric appliance, a manipulation unit thereof can visually represent a manipulation component, therefore a user can trigger the electric appliance to execute a corresponding control instruction by manipulating the manipulation unit as long as the user knows a control mode of the manipulation component. And then, in the present disclosure, the difficulty in manipulation is only associated with a user's familiarity with the manipulation component itself, and is no longer subject to the familiarity with a remote controller, thereby further improving the convenience of manipulation.

BRIEF DESCRIPTION OF THE DRAWINGS

In order to more clearly illustrate the embodiments of the present disclosure or the technical solutions in the prior art, the drawings required in the description of the embodiments or the prior art will be briefly described below. Obviously, the drawings in the following description are only some embodiments of the present disclosure, and other drawings can be obtained according to these drawings by those skilled in the art without inventive efforts.

DETAILED DESCRIPTION

The technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

The terms "first", "second", "third", "fourth", etc. (if present) in the description and claims of the present disclosure and the above drawings are used to distinguish similar objects without being necessarily used to describe a specific order or an order of priority. It should be understood that the data so used may be interchanged where appropriate, so that the embodiments of the present disclosure described herein can be implemented in an order other than those illustrated or described herein. In addition, the terms "comprising" and "including" and any variants thereof are intended to cover a non-exclusive inclusion, for example, a process, method, system, product, or device that comprises a series of steps or units is not necessarily limited to those steps or units that are clearly listed, but may include other steps or units that are not clearly listed or inherent to such process, method, product or device.

The technical solutions of the present disclosure will be described in detail below with specific embodiments. The following specific embodiments may be combined with each other, and the same or similar concepts or processes may not be described in some embodiments.

Figure 1:
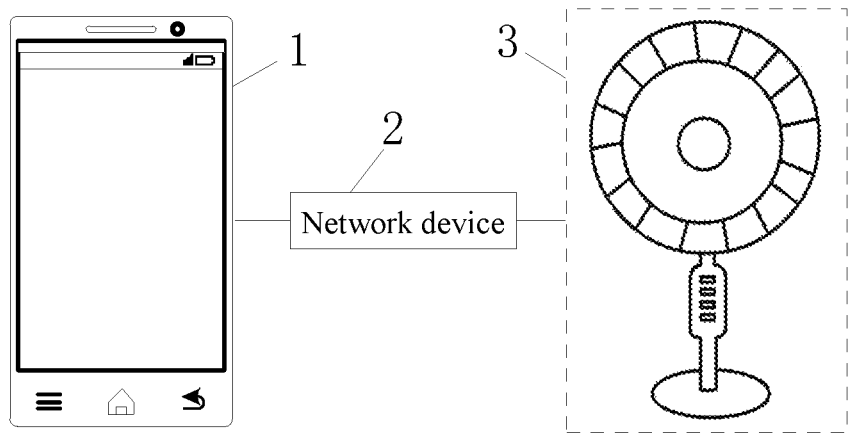
FIG. 1 is a schematic diagram of an application scenario in an embodiment of the present disclosure.

FIG. 1 is a schematic diagram of an application scenario in an embodiment of the present disclosure.

Please refer to FIG. 1, a scenario applicable to the present disclosure may be exampled as a scenario including a terminal 1, a network device 2, and an electric appliance, where the terminal 1 can communicate with the electric appliance such as an electric fan 3 by using the network device 2.

In an implementation, the network device 2 may be at least one of the following: a remote server, a local area network device, a Bluetooth device, and a gateway device.

In an implementation, the terminal 1 may be understood as any device configured with a processor, a memory, a display component and a manipulation component. Meanwhile, the display component and the manipulation component may also be the same component, such as a touch screen.

In a specific implementation process, the terminal 1 may be a mobile phone, a tablet computer, a computer, or the like.

In an implementation, the electric appliance may be any other device having a manipulation component in addition to the electric fan 3.

In a specific implementation process, the electric appliance may be a household appliance such as a television set, a washing machine, an electric lamp, or an office appliance such as a printer, a copying machine, or a scanner.

Meanwhile, the terminal 1 can also be used as an electric appliance when it is controlled, that is, a mobile phone, a tablet computer, a computer, etc., may also be regarded as a controlled electric appliance. The electric appliance can also be used to control other electric appliances in the case where a corresponding processor, a memory, a display component, and manipulation component are configured, and therefore, the electric appliance can also be regarded as a terminal.

It can be seen that, in the applicable schemes of the embodiment, any device that implements control can be regarded as the terminal 1, and any controlled device can be regarded as an electric appliance.

Figure 2:
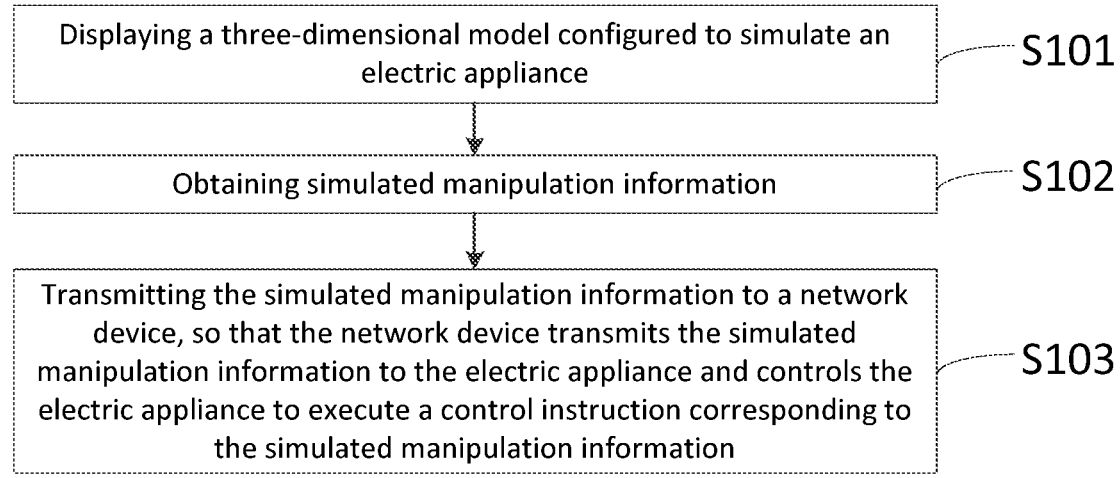
FIG. 2 is a first schematic flow chart of an electric appliance control method on a terminal side in an embodiment of the present disclosure.

FIG. 2 is a first schematic flow chart of an electric appliance control method on a terminal side in an embodiment of the present disclosure.

Please refer to FIG. 2, the electric appliance control method includes:

S101: Displaying a three-dimensional model configured to simulate an electric appliance.

The three-dimensional model can be understood as a three-dimensional model that is consistent with or similar to a shape of the electric appliance, and specifically may be a model built according to the shape of the electric appliance.

The three-dimensional model may include a manipulation unit configured to simulate a manipulation component on the electric appliance. The displayed shape of the manipulation unit may be the same as the manipulation component of the electric appliance, and moreover, the manipulation unit may changes with the manipulation in a same way as the manipulation component changes when being manipulated.

In an implementation, if the manipulation component is a button, then the manipulation unit is a button unit configured to simulate the button, the simulated manipulation is a click on the button unit, and the actual manipulation corresponding to the simulated manipulation is a press on the button. In a specific implementation process, if the button is structurally capable of being pressed down after being pressed, then the button unit in the three-dimensional model can also be displayed as a displayed content being pressed down.

In an implementation, if the manipulation component is a knob, then the manipulation unit is a knob unit configured to simulate the knob, the simulated manipulation is sliding the knob unit, and the actual manipulation corresponding to the simulated manipulation is rotating the knob. In a specific implementation process, if the knob is structurally capable of rotating after being rotated, then the knob unit in the three-dimensional model can also be displayed as a displayed content being rotated.

In an implementation, if the manipulation component is a slider, the manipulation unit includes a slider unit configured to simulate the slider, the simulated manipulation is sliding the slider unit, and the actual manipulation corresponding to the simulated manipulation is sliding the slider. In a specific implementation process, if the slider is structurally capable of sliding after being slid, then the slider unit in the three-dimensional model can also be displayed as a displayed content in which a sliding occurs.

In other optional embodiments, the manipulation component may also be, for example, an interaction interface of a touch screen, a switch key, or the like.

It can be seen that the terminal may be configured with a corresponding algorithm to change the displayed content of the manipulation unit according to the simulated manipulation, and the terminal may also receive feedback information transmitted by an electric appliance, and then change the displayed content of the manipulation unit according to the feedback information.

S102: Obtaining simulated manipulation information.

The simulated manipulation information can be understood as information that is the same as information generated by the manipulation component corresponding to the manipulation unit after an actual manipulation corresponding to the simulated manipulation is performed, which may specifically be generated after a user performs the simulated manipulation on the manipulation unit.

In an implementation, the simulated manipulation information may be information describing the simulated manipulation, i.e. the actual manipulation. For example, if the manipulation component is a knob and the manipulation unit is a knob unit, then the simulated manipulation information may be information describing a position after the knob is rotated and information of an identification of the knob; if the manipulation component is a button and the manipulation unit is a button unit, then the simulated manipulation information may be trigger information describing the button being pressed and information of an identification of the button.

In another implementation, the simulated manipulation information may also be a control instruction itself that can be executed by an electric appliance.

It can be seen that any information that can be recognized by an electric appliance and directly or indirectly makes the electric appliance achieve the control of a corresponding function can be used as the simulated manipulation information.

S103: Transmitting the simulated manipulation information to a network device, so that the network device transmits the simulated manipulation information to the electric appliance and controls the electric appliance to execute a control instruction corresponding to the simulated manipulation information.

Figure 3:
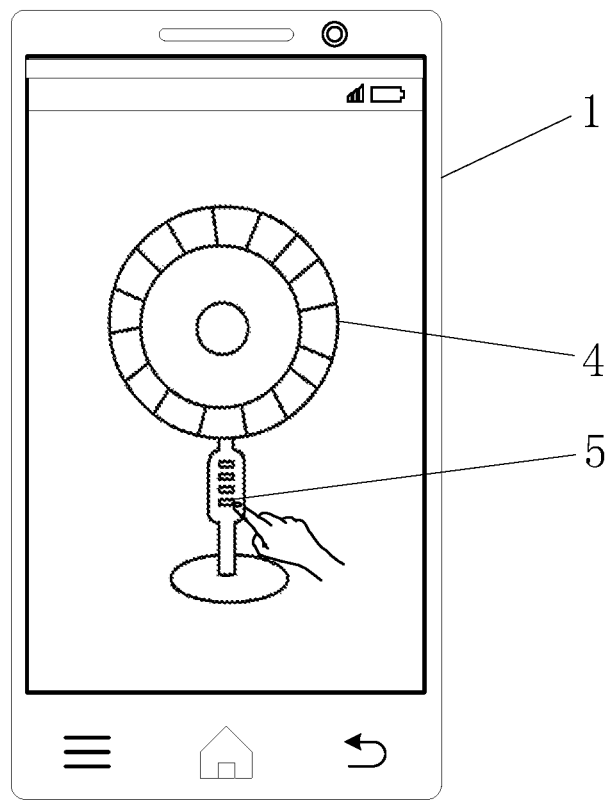
FIG. 3 is a schematic diagram of an interface of an electric appliance control method in an embodiment of the present disclosure.

FIG. 3 is a schematic diagram of an interface of an electric appliance control method in an embodiment of the present disclosure.

Please refer to FIG. 3, taking the electric appliance being an electric fan as an example, a three-dimensional model 4 of the electric fan may be displayed on the terminal 1, and in the three-dimensional model 4, there may be a button unit 5 as a manipulation unit, and after a click on the button unit 5, the transmission of corresponding simulated manipulation information is triggered, so that the electric fan 3 performs a corresponding operation.

The electric appliance control method provided by the embodiment provides an object for a user to manipulate by displaying a three-dimensional model which is configured to simulate an electric appliance and which includes a manipulation unit configured to simulate a manipulation component on the electric appliance. The embodiment also controls the electric appliance to execute a control instruction corresponding to the simulated manipulation information by obtaining simulated manipulating information and transmitting the simulated manipulation information to a network device. In the embodiment, since the object to be manipulated is a three-dimensional model of an electric appliance, a manipulation unit therein can visually represent a manipulation component, therefore a user can trigger the electric appliance to execute the corresponding control instruction by manipulating the manipulation unit as long as the user knows a control mode of the manipulation component. And then, the difficulty of manipulation in the embodiment is only associated with a user's familiarity with the manipulation component itself, and is no longer subject to the familiarity with a remote controller, thereby further improving the convenience of manipulation.

Figure 4:
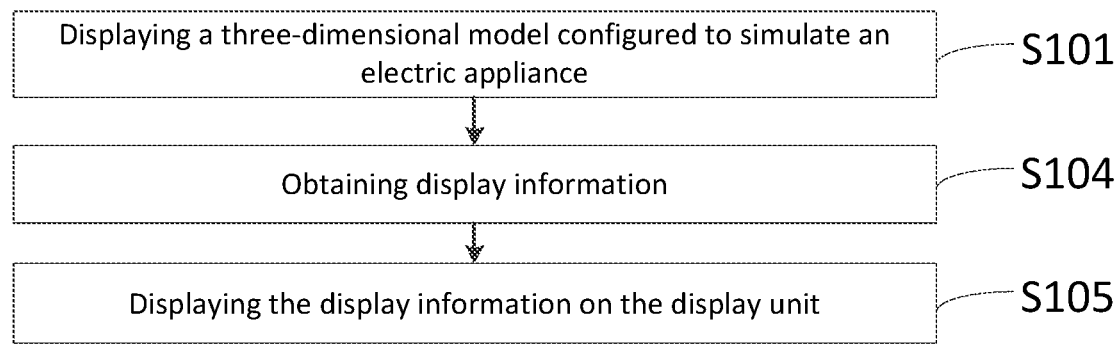
FIG. 4 is a second schematic flow chart of an electric appliance control method on a terminal side in an embodiment of the present disclosure.

FIG. 4 is a second schematic flow chart of an electric appliance control method on a terminal side in an embodiment of the present disclosure.

Please refer to FIG. 4, the electric appliance control method further includes:

S104: Obtaining display information.

The display information may be understood as information currently displayed by the display component of the electric appliance. If the display component of the electric appliance is an indicator light, then the display information may be information indicating which indicator light is illuminated and what color of light is emitted. If the display component of the electric appliance is a display screen, then the display information may be information that can be displayed on the display screen.

In order to display the display information, the three-dimensional model further includes a display unit configured to simulate the display component on the electric appliance. If the display component is an indicator light, then the display unit may be an indicator light unit configured to simulate the indicator light; and if the display component is a display screen, then the display unit may be a display screen unit configured to simulate the display screen.

S105: Displaying the display information on the display unit.

If the display component is a display screen, then the displaying the display information refers to directly displaying on the display screen unit the content that is displayed on the display screen; if the display component is an indicator light, then the displaying the display information refers to displaying the content indicated by the indicator light using the indicator unit, e.g. the flashing of the light, the illumination of the light, and the like.

Step S104 can be implemented at any timing after step S101.

In addition, before the display unit displays the display information, the display information of the display component may be further processed, for example, changing its resolution, size, changing a sampling frequency, etc., which may be beneficial to reduce information transmission, and may also be beneficial to ensure that the display information can be adapted to be displayed in the display unit. By displaying the display information of the display component through the display unit, the implementation can ensure that the terminal can accurately and timely feedback the change of the electrical appliance, thereby facilitating a user to control the electrical appliance timely and accurately.

Figure 5:
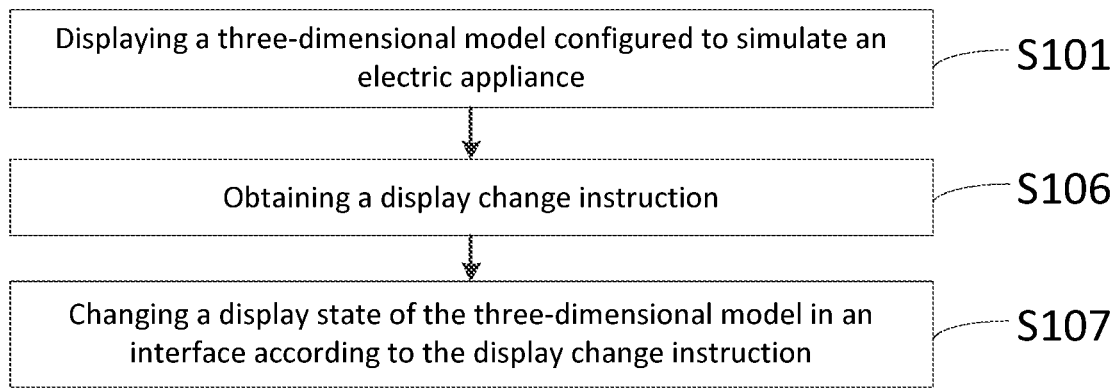
FIG. 5 is a third schematic flow chart of an electric appliance control method on a terminal side in an embodiment of the present disclosure.

FIG. 5 is a third schematic flow chart of an electric appliance control method on a terminal side in an embodiment of the present disclosure.

Please refer to FIG. 5, the electric appliance control method further includes:

S106: Obtaining a display change instruction.

The display change instruction can be understood as an instruction that can make a display state of the three-dimensional model change. It can be distinguished from an instruction that makes the three-dimensional model change, that is, the display change instruction does not cause the shape of any part of the three-dimensional model to change.

Specifically, in an implementation, the display change instruction includes at least one of the following: a zoom instruction to control a size of the three-dimensional model, a rotation instruction to control the three-dimensional model to rotate, and a movement instruction to control the three-dimensional model to move.

S107: Changing a display state of the three-dimensional model in an interface according to the display change instruction.

Through the above implementation, the zooming, rotating, moving, and the like of the three-dimensional model can be realized, which facilitates a user to freely view the three-dimensional model, and which is advantageous for finding a manipulation unit that needs to be manipulated and viewing the display unit that needs to be checked.

In an implementation, in order to be adapted to a user's simulated manipulation, the change of the display state can be triggered automatically even if it is not an active manipulation of a user, that is, even if a display change instruction is not obtained.

For example, when a user selects a manipulation unit that needs to be manipulated currently, rotation and/or movement is performed automatically so that the manipulation unit is in a specific area of the interface, such as the central area of the interface. For another example, when a user selects a manipulation unit that needs to be manipulated currently, zooming is performed automatically so that the size of the manipulation unit becomes a size adapted for operation.

For another example, for manipulation units configured to be operated successively, after the manipulation of one of manipulation units is completed, the content currently displayed by the three-dimensional model is processed to be a display state adapted for manipulation of another manipulation unit by automatically rotating, moving, zooming, or the like.

Through the use of the above implementations, it may be advantageous to automatically process the three-dimensional model into a display state adapted for operation.

In an implementation, when a user performs a simulated manipulation, the terminal can change the display of the manipulation unit that is under the simulated manipulation, in response to the simulated manipulation of the user. For example, the color of the manipulation unit may be changed, or the manipulation unit may be illuminated, thereby showing which manipulation unit is currently under the simulated manipulation, and avoiding the user's misoperation.

In an implementation, after a user performs the simulated manipulation and the terminal transmits the simulated manipulation information, related information can be fed back on the terminal to inform the user that the simulated manipulation information has been transmitted.

In an interactive interface, only a three-dimensional model of a single electrical appliance may be set, or three-dimensional models of a plurality of electrical appliances may be set, a manner of position arrangement for the plurality of electrical appliances may be set according to an actual spatial position relationship of the plurality of electrical appliances, and further, the user can perform manipulation according to the position relationship and the action relationship between the electric appliances.

The implementation of the plurality of electrical appliances may also be applied to a scenario in which a plurality of electric appliances are linked.

For example, for a set-top box and a television set, linkage control is usually needed in daily life, that is, it is necessary to turn on the set-top box only when the television set is turned on and its input source is adjusted to the port of the connected set-top box, and after the set-top box is turned on and verified to access the network, the television set will receive and display information. Therefore, the three-dimensional model of the set-top box and the three-dimensional model of the television set may be displayed in the interface, and through the feedback of the display information of the television set and the set-top box and the control thereof, the turning on and configuration of the set-top box and the television set can be completed.

The electric appliance control method provided by the embodiment provides an object for a user to manipulate by displaying a three-dimensional model which is configured to simulate an electric appliance and which includes a manipulation unit configured to simulate a manipulation component on the electric appliance. The embodiment also controls the electric appliance to execute a control instruction corresponding to the simulated manipulation information by obtaining simulated manipulation information and transmitting the simulated manipulation information to a network device. In the embodiment, since the object to be manipulated is a three-dimensional model of an electric appliance, a manipulation unit therein can visually represent a manipulation component, therefore a user can trigger the electric appliance to execute a corresponding control instruction by manipulating the manipulation unit as long as the user knows a control mode of the manipulation component. And then, in the embodiment, the difficulty in manipulation is only associated with a user's familiarity with the manipulation component itself, and is no longer subject to the familiarity with a remote controller, thereby further improving the convenience of manipulation.

Figure 6:
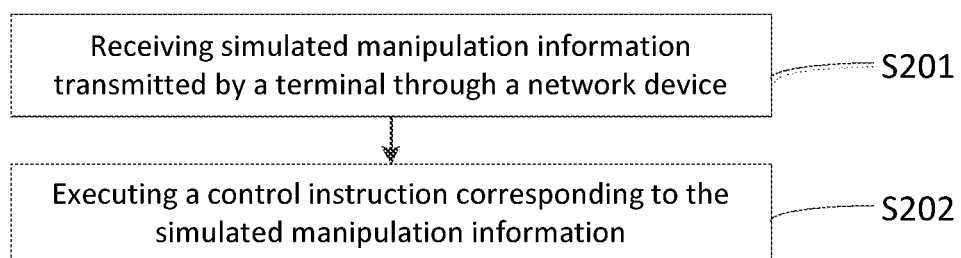
FIG. 6 is a schematic flow chart of an electric appliance control method on an electric appliance side in an embodiment of the present disclosure.

FIG. 6 is a schematic flow chart of an electric appliance control method on an electric appliance side in an embodiment of the present disclosure.

Please refer to FIG. 6, the electric appliance control method includes

S201: Receiving simulated manipulation information transmitted by a terminal through a network device.

The simulated manipulation information is generated after a user performs a simulated manipulation on a manipulation unit in a three-dimensional model displayed by the terminal. The three-dimensional model is configured to simulate the electric appliance, and the manipulation unit is configured to simulate a manipulation component on the electric appliance. The simulated manipulation information is the same as information generated by the manipulation component corresponding to the manipulation unit after an actual manipulation corresponding to the simulated manipulation is performed.

S202: Executing a control instruction corresponding to the simulated manipulation information.

Optionally, the three-dimensional model further includes a display unit configured to simulate a display component on the electric appliance, and the method further includes: transmitting display information to the network device so that the terminal displays the display information on the display unit, where the display information is information currently displayed by the display component of the electric appliance.

Optionally, if the manipulation component is a button, then the manipulation unit is a button unit configured to simulate the button, the simulated manipulation is a click on the button unit, and the actual manipulation corresponding to the simulating operation is a press on the button.

Optionally, if the manipulation component is a knob, then the manipulation unit is a knob unit configured to simulate the knob, the simulated manipulation is sliding the knob unit, and the actual manipulation corresponding to the simulated manipulation is rotating the knob.

Optionally, if the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

In the electric appliance control method provided by the embodiment, since the object to be manipulated is a three-dimensional model of an electric appliance, a manipulation unit therein can visually represent a manipulation component, therefor a user can trigger the electric appliance to execute a corresponding control instruction by manipulating the manipulation unit as long as the user knows a control mode of the manipulation component. And then, the difficulty of manipulation in the embodiment is only associated with a users familiarity with the manipulation component itself, and is no longer subject to the familiarity with a remote controller, thereby further improving the convenience of manipulation.

Figure 7:
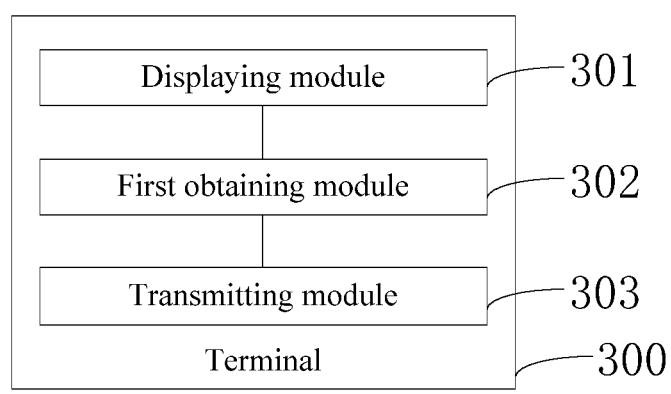
FIG. 7 is a first schematic structure diagram of a terminal in an embodiment of the present disclosure.

FIG. 7 is a first schematic structure diagram of a terminal in an embodiment of the present disclosure.

Please refer to FIG. 7, the terminal 300 includes:

a displaying module 301, configured to display a three-dimensional model where the three-dimensional model is configured to simulate an electric appliance and includes a manipulation unit configured to simulate a manipulation component on the electric appliance;

a first obtaining module 302, configured to obtain simulated manipulation information, where the simulated manipulation information is generated after a user performs a simulated manipulation on the manipulation unit; the simulated manipulation information is the same as information generated by the manipulation component corresponding to the manipulation unit after an actual manipulation corresponding to the simulated manipulation is performed;

a transmitting module 303, configured to transmit the simulated manipulation information to a network device, so that the network device transmits the simulated manipulation information to the electric appliance and controls the electric appliance to execute a control instruction corresponding to the simulated manipulation information.

The terminal provided by the embodiment provides an object for a user to manipulate by displaying a three-dimensional model which is configured to simulate an electric appliance and which includes a manipulation unit configured to simulate a manipulation component on the electric appliance. The embodiment also controls the electric appliance to execute a control instruction corresponding to the simulated manipulation information by obtaining simulated manipulation information and transmitting the simulated manipulation information to a network device. In the embodiment, since the object to be manipulated is a three-dimensional model of an electric appliance, a manipulation unit therein can visually represent a manipulation component, therefore a user can trigger the electric appliance to execute a corresponding control instruction by manipulating the manipulation unit as long as the user knows a control mode of the manipulation component. And then, the difficulty of manipulation in the embodiment is only associated with a users familiarity with the manipulation component itself, and is no longer subject to the familiarity with a remote controller, thereby further improving the convenience of manipulation.

Figure 8:
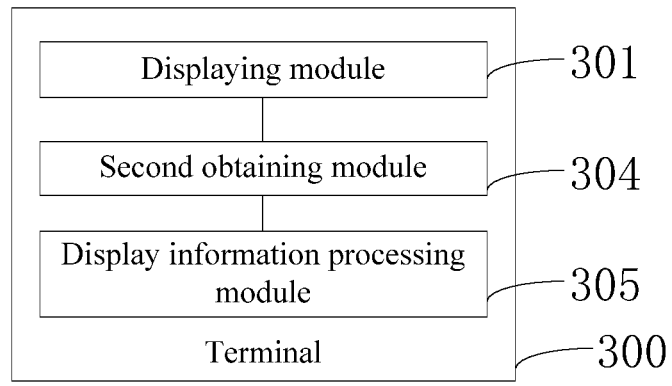
FIG. 8 is a second schematic structure diagram of a terminal in an embodiment of the present disclosure.

FIG. 8 is a second schematic structure diagram of a terminal in an embodiment of the present disclosure.

Please refer to FIG. 8, optionally, the three-dimensional model further includes a display unit configured to simulate a display component on the electric appliance, and the terminal 300 further includes:

a second obtaining module 304, configured to obtain display information, where the display information is information currently displayed by the display component of the electric appliance;

a display information processing module 305, configured to display the display information on the display unit.

Figure 9:
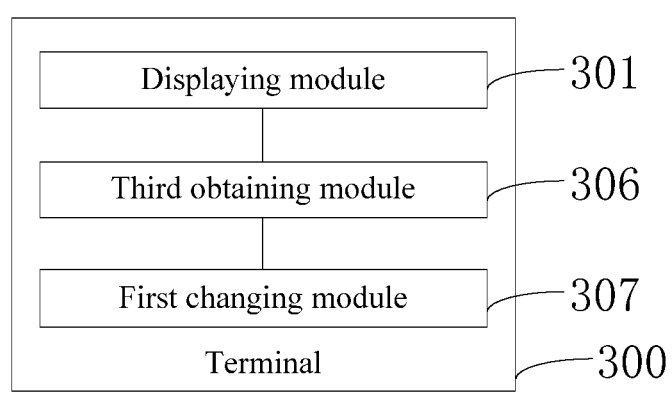
FIG. 9 is a third schematic structure diagram of a terminal in an embodiment of the present disclosure.

FIG. 9 is a third schematic structure diagram of a terminal in an embodiment of the present disclosure.

Please refer to FIG. 9, the terminal 300 further includes:

a third obtaining module 306, configured to obtain a display change instruction; where the display change instruction includes at least one of the following: a zoom instruction to control a size of the three-dimensional model, a rotation instruction to control the three-dimensional model to rotate, and a movement instruction to control the three-dimensional model to move;

a first changing module 307, configured to change a display state of the three-dimensional model in an interface according to the display change instruction.

Optionally, if the manipulation component is a button, then the manipulation unit is a button unit configured to simulate the button, the simulated manipulation is a click on the button unit, and the actual manipulation corresponding to the simulated manipulation is a press on the button.

If the manipulation component is a knob, then the manipulation unit is a knob unit configured to simulate the knob, the simulated manipulation is sliding the knob unit, and the actual manipulation corresponding to the simulated manipulation is rotating the knob.

If the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

The terminal provided by the embodiment provides an object for a user to manipulate by displaying a three-dimensional model which is configured to simulate an electric appliance and which includes a manipulation unit configured to simulate a manipulation component on the electric appliance. The embodiment also controls the electric appliance to execute a control instruction corresponding to the simulated manipulation information by obtaining simulated manipulation information and transmitting the simulated manipulation information to a network device. In the embodiment, since the object to be controlled is a three-dimensional model of an electric appliance, a manipulation unit therein can visually represent a manipulation component, therefore a user can trigger the electric appliance to execute a corresponding control instruction by manipulating the manipulation unit as long as the user knows a control mode of the manipulation component. And then, the difficulty of manipulation in the embodiment is only associated with a users familiarity with the manipulation component itself, and is no longer subject to the familiarity with a remote controller, thereby further improving the convenience of manipulation.

Figure 10:
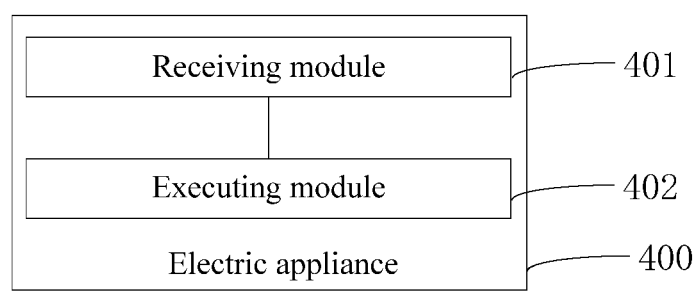
FIG. 10 is a schematic structure diagram of an electric appliance in an embodiment of the present disclosure.

FIG. 10 is a schematic structure diagram of an electric appliance in an embodiment of the present disclosure.

Please refer to FIG. 10, the electric appliance includes:

a receiving module 401, configured to receive simulated manipulation information transmitted by a terminal through a network device, where the simulated manipulation information is generated after a user performs a simulated manipulation on a manipulation unit in a three-dimensional model displayed by the terminal; where the three-dimensional model is configured to simulate the electric appliance, and the manipulation unit is configured to simulate a manipulation component on the electric appliance; where the simulated manipulation information is the same as information generated by the manipulation component corresponding to the manipulation unit after an actual manipulation corresponding to the simulated manipulation is performed;

an executing module 402, configured to execute a control instruction corresponding to the simulated manipulation information.

Optionally, the three-dimensional model further includes a display unit configured to simulate a display component on the electric appliance, and the electric appliance further includes:

a display information transmitting module, configured to transmit display information to the network device so that the terminal displays the display information on the display unit, where the display information is information currently displayed by the display component of the electric appliance.

Optionally, if the manipulation component is a button, then the manipulation unit is a button unit configured to simulate the button, the simulated manipulation is a click on the button unit, and the actual manipulation corresponding to the simulated manipulation is a press on the button.

Optionally, if the manipulation component is a knob, then the manipulation unit is a knob unit configured to simulate the knob, the simulated manipulation is sliding the knob unit, and the actual manipulation corresponding to the simulated manipulation is rotating the knob.

Optionally, if the manipulation component is a slider, the manipulation unit includes a slider unit configured to simulate the slider, the simulated manipulation is sliding the slider unit, and the actual manipulation corresponding to the simulated manipulation is sliding the slider.

Optionally, the network device is at least one of the following: a remote server, a local area network device, a Bluetooth device, and a gateway device.

In the electric appliance provided by the embodiment, since the object to be manipulated is a three-dimensional model of an electric appliance, a manipulation unit therein can visually represent a manipulation component, therefore a user can trigger the electric appliance to execute a corresponding control instruction by manipulating the manipulation unit as long as the user knows a control mode of the manipulation component. And then, the difficulty of manipulation in the embodiment is only associated with a user's familiarity with the manipulation component itself, and is no longer subject to the familiarity with a remote controller, thereby further improving the convenience of manipulation.

Figure 11:
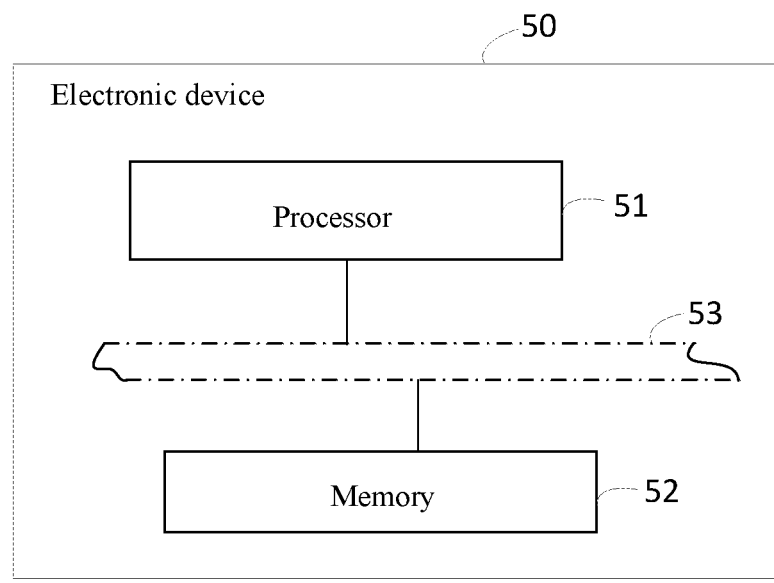
FIG. 11 is a schematic structure diagram of an electronic equipment in an embodiment of the present disclosure.

FIG. 11 is a schematic structure diagram of an electronic equipment of the present disclosure.

Please refer to FIG. 11, the embodiment also provides an electronic equipment 50, including a memory 51 and a processor 52.

The memory 52 is configured to store a computer program, and the memory may also be a flash.

The processor 51 is configured to execute executable instructions to implement each of the steps in the above method. For details, the related descriptions in the foregoing method embodiments may be referred to.

Optionally, the memory 52 can be either separate from or integrated with the processor 51.

When the memory 52 is a device separate from the processor 51, the electronic equipment 50 may further include:

a bus 53, configured to connect the memory 52 and the processor 51.

The embodiment also provides a readable storage medium storing a computer program thereon. An electronic equipment implements the methods provided by the various embodiments described above when the computer program is executed by at least one processor of the electronic equipment.

The embodiment also provides a program product including a computer program stored in a readable storage medium. At least one processor of an electronic equipment can read the computer program from the readable storage medium, and the at least one processor executes the computer program such that the electronic equipment implements the methods provided by the various embodiments described above.

Those skilled in the art will understand that all or part of the steps to implement the various method embodiments described above may be accomplished by hardware related to the program instructions. The aforementioned program may be stored in a computer readable storage medium.

When the program is executed, the steps including the foregoing method embodiments are performed. The foregoing storage medium includes various media that can store program codes, such as a ROM, a RAM, a magnetic disk, or an optical disk.

Finally, it should be noted that the above embodiments are merely used to illustrate the technical solutions of the present disclosure, rather than limiting them. Although the present disclosure has been described in detail with reference to the foregoing embodiments, those skilled in the art will understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present disclosure.

What is claimed is:

1. An electric appliance control method, applied to a terminal, comprising:
    displaying a three-dimensional model configured to simulate an electric appliance; where the three-dimensional model comprises a manipulation unit that is displayed on the three-dimensional model and that is configured to simulate a manipulation component on the electric appliance;
    obtaining simulated manipulation information, wherein the simulated manipulation information is generated after a user performs a simulated manipulation on the manipulation unit; wherein the simulated manipulation information is the same as information generated by the manipulation component corresponding to the manipulation unit after an actual manipulation corresponding to the simulated manipulation is performed; and
    transmitting the simulated manipulation information to a network device, so that the network device transmits the simulated manipulation information to the electric appliance and controls the electric appliance to execute a control instruction corresponding to the simulated manipulation information,
    wherein, a displayed shape of the manipulation unit is the same as the manipulation component of the electric appliance, and the manipulation unit changes with the simulated manipulation in a same way as the manipulation component changes with the actual manipulation corresponding to the simulated manipulation;
    wherein, the electric appliance control method further comprises: when the manipulation unit is selected by the user, changing a display state of the three-dimensional model automatically to display the selected manipulation unit in a specific area of an interface.

2. The method according to claim 1, wherein the three-dimensional model further comprises a display unit configured to simulate a display component on the electric appliance, and after the displaying a three-dimensional model configured to simulate an electric appliance, the method further comprises:
    obtaining display information, wherein the display information is information currently displayed by the display component of the electric appliance;
    displaying the display information on the display unit.

3. The method according to claim 1, wherein after the displaying a three-dimensional model configured to simulate an electric appliance, the method further comprises:
    obtaining a display change instruction, wherein the display change instruction comprises at least one of the following: a zoom instruction to control a size of the three-dimensional model, a rotation instruction to control the three-dimensional model to rotate, and a movement instruction to control the three-dimensional model to move;
    changing a display state of the three-dimensional model in an interface according to the display change instruction.

4. The method according to claim 1, wherein if the manipulation component is a button, then the manipulation unit is a button unit configured to simulate the button, the simulated manipulation is a click on the button unit, and the actual manipulation corresponding to the simulated manipulation is a press on the button.

5. The method according to claim 1, wherein if the manipulation component is a knob, then the manipulation unit is a knob unit configured to simulate the knob, the simulated manipulation is rotating the knob unit, and the actual manipulation corresponding to the simulated manipulation is rotating the knob.

6. The method according to claim 1, wherein if the manipulation component is a slider, the manipulation unit comprises a slider unit configured to simulate the slider, the simulated manipulation is sliding the slider unit, and the actual manipulation corresponding to the simulated manipulation is sliding the slider.

7. The method according to claim 1, wherein the network device is at least one of the following: a remote server, a local area network device, a Bluetooth device, and a gateway device.

8. A terminal, comprising:
    a memory and a processor; wherein
    the memory is configured to store executable instructions of the processor; and
    the processor, when executing the executable instructions, is configured to:
    display a three-dimensional model, wherein the three-dimensional model is configured to simulate an electric appliance; wherein the three-dimensional model comprises a manipulation unit that is displayed on the three-dimensional model and that is configured to simulate a manipulation component on the electric appliance;
    obtain simulated manipulation information, wherein the simulated manipulation information is generated after a user performs a simulated manipulation on the manipulation unit; wherein the simulated manipulation information is the same as information generated by the manipulation component corresponding to the manipulation unit after an actual manipulation corresponding to the simulated manipulation is implemented;
    transmit the simulated manipulation information to a network device, so that the network device transmits the simulated manipulation information to the electric appliance and controls the electric appliance to execute a control instruction corresponding to the simulated manipulation information,
    wherein, a displayed shape of the manipulation unit is the same as the manipulation component of the electric appliance, and the manipulation unit changes with the simulated manipulation in a same way as the manipulation component changes with the actual manipulation corresponding to the simulated manipulation;
    wherein, the processor, when executing the executable instructions, is further configured to: when the manipulation unit is selected by the user, change a display state of the three-dimensional model automatically to display the selected manipulation unit in a specific area of an interface.

9. The terminal according to claim 8, wherein the three-dimensional model further comprises a display unit configured to simulate a display component on the electric appliance, and the processor is further configured to:
obtain display information, wherein the display information is information currently displayed by the display component of the electric appliance;
display the display information on the display unit.

10. The terminal according to claim 8, wherein the processor is further configured to:
obtain a display change instruction; wherein the display change instruction comprises at least one of the following: a zoom instruction to control a size of the three-dimensional model, a rotation instruction to control the three-dimensional model to rotate, and a movement instruction to control the three-dimensional model to move;
change a display state of the three-dimensional model in an interface according to the display change instruction.

11. The terminal according to claim 8, wherein if the manipulation component is a button, then the manipulation unit is a button unit configured to simulate the button, the simulated manipulation is a click on the button unit, and the actual manipulation corresponding to the simulated manipulation is a press on the button.

12. The terminal according to claim 8, wherein if the manipulation component is a knob, then the manipulation unit is a knob unit configured to simulate the knob, the simulated manipulation is rotating the knob unit, and the actual manipulation corresponding to the simulated manipulation is rotating the knob.

13. The terminal according to claim 8, wherein if the manipulation component is a slider, the manipulation unit includes a slider unit configured to simulate the slider, the simulated manipulation is sliding the slider unit, and the actual manipulation corresponding to the simulated manipulation is sliding the slider.

14. The terminal according to claim 8, wherein the network device is at least one of the following: a remote server, a local area network device, a Bluetooth device, and a gateway device.

15. An electric appliance, comprising:
a memory and a processor; wherein
the memory is configured to store executable instructions of the processor; and
the processor, when executing the executable instructions, is configured to:
receive simulated manipulation information transmitted by a terminal through a network device, wherein the simulated manipulation information is generated after a user performs a simulated manipulation on a manipulation unit in a three-dimensional model displayed by the terminal; wherein the three-dimensional model is configured to simulate the electric appliance, and the manipulation unit is displayed on the three-dimensional model and configured to simulate a manipulation component on the electric appliance; and wherein the simulated manipulation information is the same as information generated by the manipulation component corresponding to the manipulation unit after an actual manipulation corresponding to the simulated manipulation is performed; and
execute a control instruction corresponding to the simulated manipulation information,
wherein, a displayed shape of the manipulation unit is the same as the manipulation component of the electric appliance, and the manipulation unit changes with the simulated manipulation in a same way as the manipulation component changes the actual manipulation corresponding to the simulated manipulation;
wherein, when the manipulation unit is selected by the user, a display state of the three-dimensional model is changed automatically to display the selected manipulation unit in a specific area of an interface on the terminal.

16. The electric appliance according to claim 15, wherein the three-dimensional model further comprises a display unit configured to simulate a display component on the electric appliance, and the processor is further configured to:
transmit display information to the network device so that the terminal displays the display information on the display unit, wherein the display information is information currently displayed by the display component of the electric appliance.

* * * * *